(12) United States Patent
Thompson et al.

(10) Patent No.: US 10,887,342 B2
(45) Date of Patent: *Jan. 5, 2021

(54) HEALTH MONITOR BASED DISTRIBUTED DENIAL OF SERVICE ATTACK MITIGATION

(71) Applicant: A10 Networks, Inc., San Jose, CA (US)

(72) Inventors: Micheal Thompson, Meridian, TX (US); Vernon Richard Groves, Duvall, WA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,983

(22) Filed: Dec. 14, 2018

(65) Prior Publication Data

US 2019/0116204 A1    Apr. 18, 2019

Related U.S. Application Data

(63) Continuation of application No. 15/851,582, filed on Dec. 21, 2017, now Pat. No. 10,187,423, which is a continuation of application No. 14/979,937, filed on Dec. 28, 2015, now Pat. No. 9,860,271, which is a continuation of application No. 14/010,221, filed on Aug. 26, 2013, now Pat. No. 9,294,503.

(51) Int. Cl.
*G06F 11/00* (2006.01)
*H04L 29/06* (2006.01)

(52) U.S. Cl.
CPC ...... *H04L 63/1458* (2013.01); *H04L 63/1416* (2013.01)

(58) Field of Classification Search
CPC ................. H04L 63/1416; H04L 63/1458
USPC ................. 726/22–25, 13; 709/235
See application file for complete search history.

(56) References Cited

U.S. PATENT DOCUMENTS

| | | | |
|---|---|---|---|
| 7,409,712 B1 * | 8/2008 | Brooks | H04L 63/1458 713/188 |
| 7,478,429 B2 * | 1/2009 | Lyon | H04L 29/06027 726/2 |
| 7,953,855 B2 * | 5/2011 | Jayawardena | H04L 63/1408 370/401 |
| 8,089,871 B2 * | 1/2012 | Iloglu | H04L 63/1408 370/230 |
| 8,375,453 B2 | 2/2013 | Jackson et al. | |
| 8,719,446 B2 * | 5/2014 | Spatscheck | H04L 63/1458 709/238 |

(Continued)

*Primary Examiner* — Samson B Lemma
(74) *Attorney, Agent, or Firm* — Keith Kline; The Kline Law Firm PC

(57) ABSTRACT

Provided are methods and systems for mitigating a distributed denial of service (DDoS) event. The method may commence with sending a request to a health monitor concerning a state of a network. The method may continue with attributing a lack of response to the request from the health monitor to be an indication of a collapse of a collapsible virtual data circuit associated with network data traffic. The collapsible virtual data circuit may be designed to collapse in response to the DDoS event in the network. The method may include redirecting the network data traffic associated with the collapsible virtual data circuit based on the indication of the collapse of the collapsible virtual data circuit.

18 Claims, 4 Drawing Sheets

(56) References Cited

U.S. PATENT DOCUMENTS

| | | | |
|---|---|---|---|
| 9,197,666 B2* | 11/2015 | Carney | H04L 63/1408 |
| 2003/0126252 A1 | 7/2003 | Abir | |
| 2004/0148520 A1* | 7/2004 | Talpade | H04L 63/0227 |
| | | | 726/22 |
| 2005/0180416 A1* | 8/2005 | Jayawardena | H04L 45/00 |
| | | | 370/389 |
| 2006/0185014 A1* | 8/2006 | Spatscheck | H04L 63/1458 |
| | | | 726/23 |
| 2006/0230444 A1* | 10/2006 | Iloglu | H04L 63/1408 |
| | | | 726/14 |
| 2007/0280114 A1* | 12/2007 | Chao | H04L 43/0888 |
| | | | 370/235.1 |
| 2010/0138921 A1* | 6/2010 | Na | H04L 63/1458 |
| | | | 726/22 |
| 2012/0036579 A1* | 2/2012 | Lee | H04L 63/1425 |
| | | | 726/25 |
| 2013/0110595 A1* | 5/2013 | Acosta-Cazaubon | |
| | | | G06Q 30/02 |
| | | | 705/14.7 |

* cited by examiner

HEALTH MONITOR BASED DISTRIBUTED DENIAL OF SERVICE ATTACK MITIGATION

CROSS-REFERENCE TO RELATED APPLICATIONS

The present application is a continuation of, and claims the priority benefit of, U.S. patent application Ser. No. 15/851,582 filed on Dec. 21, 2017, entitled "Health Monitor Based Distributed Denial of Service Attack Mitigation", which is a continuation of U.S. patent application Ser. No. 14/979,937 filed on Dec. 28, 2015, entitled "Health Monitor Based Distributed Denial of Service Attack Mitigation", now U.S. Pat. No. 9,860,271, which is a continuation of U.S. patent application Ser. No. 14/010,221 filed on Aug. 26, 2013, entitled "Health Monitor Based Distributed Denial of Service Attack Mitigation," now U.S. Pat. No. 9,294,503, the disclosures of which are incorporated herein by reference in their entirety for all purposes.

TECHNICAL FIELD

This disclosure relates generally to computer and network security and, more particularly, to mitigation of distributed denial of service (DDoS) attacks.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A Denial of Service (DoS) attack is typically an attempt to make a network machine or network resource unavailable to intended users. Generally speaking, a DoS attack is an attempt to overwhelm the capacity of a server in order to interrupt or suspend functioning of network resources associated with the server. Traditional methods for detecting DoS attacks are typically based on monitoring incoming traffic and detecting the DoS attack based on an observation of a large increase in traffic, especially when a large portion of the traffic originates from a single IP address. In this case, mitigating the DoS attack includes filtering out the traffic associated with any IP addresses identified as malicious.

However, the aforementioned technique for mitigating a DOS attack may not be very effective in mitigating a Distributed Denial of Service (DDoS) attack. In case of a DDoS attack, incoming traffic may originate from a large number of attacking machines, each having a distinct IP address.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for mitigating a DDoS attack. Specifically, a system for mitigating a DDoS attack is provided. The system may include an application delivery controller and a memory coupled to the application delivery controller. The application delivery controller may include a hardware processor configured to send a request to a health monitor concerning a state of a network. The hardware processor may be further configured to attribute a lack of response to the request from the health monitor to be an indication of a collapse of a collapsible virtual data circuit. The collapsible virtual data circuit may be designed to collapse in response to the DDoS event in the network. Based on the indication of the collapse of the collapsible virtual data circuit, the hardware processor may redirect the network data traffic associated with the collapsible virtual data circuit.

According to another approach of the present disclosure, there is provided a method for mitigating a DDoS event. The method may commence with sending a request to a health monitor concerning a state of a network. The method may continue with attributing a lack of response to the request from the health monitor to be an indication of a collapse of a collapsible virtual data circuit. The collapsible virtual data circuit may be designed to collapse in response to the DDoS event in the network. The method may further include redirecting network data traffic associated with the collapsible virtual data circuit. The network data traffic may be redirected based on the indication of the collapse of the collapsible virtual data circuit.

Additional objects, advantages, and features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
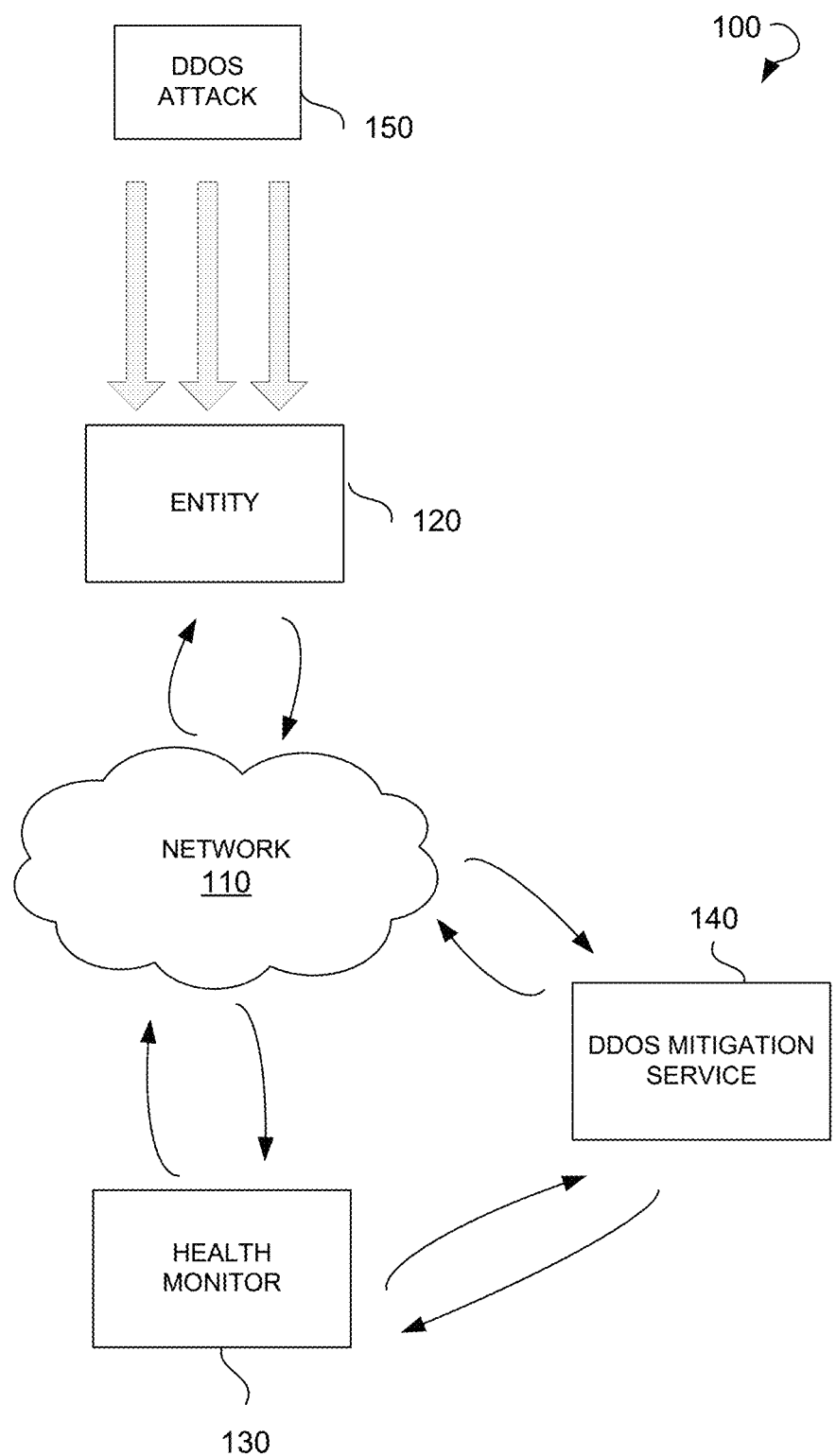
FIG. 1 shows an environment within which a method and a system for mitigating a DDoS event can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

As outlined in the summary, the embodiments of the present disclosure refer to mitigating a DDoS event. As used herein, "a DDoS event" may comprise a DDoS attack directed at a network machine or a network resource. A system for mitigating a DDoS event may evaluate health or state of a remote network machine or resource to identify a DDoS event affecting the network machine or resource and to automatically trigger a DDoS mitigation service. The system for mitigating the DDoS event may comprise a health monitor configured as a collapsible virtual data circuit. The collapsible virtual data circuit may refer to a virtual circuit configured to stop flow of data traffic as an indication of a DDoS event. During normal mode of operation, network traffic may be directed through the collapsible virtual data circuit. When the collapsible virtual data circuit collapses an additional circuit is activated and the traffic is routed through the additional circuit.

The health monitoring may involve software, hardware, signaling, and various database queries configured to determine the state of a network or resource. In a normal operation mode of the network or resource, the health monitor may utilize various health checks of the network or resource to determine the state of the system. While the health monitor is operational and the state of the network or resource can be successfully verified, there is no need to utilize the DDoS mitigation service. If the state of the network or resource cannot be verified, or in other words, the health monitor fails and the collapsible virtual data circuit collapses, another virtual data circuit can be established. When another virtual circuit data is established, the incoming traffic of the network or resource is redirected through the DDoS mitigation service, where the DDoS data packets are filtered by the DDoS mitigation service and redirected to the destination network or resource.

Thus, failure of the health monitor may be attributed to the presence of a DDoS event and cause rerouting of the traffic to the DDoS mitigation service. Once it is determined that the network or resource is no longer experiencing a DDoS event, the ability of the health monitor to check the state of the network or resource is restored by redirecting the network traffic from the DDoS mitigation service back to the network or resource.

Referring now to the drawings, FIG. 1 illustrates an environment 100 within which a method and a system for mitigating a DDoS attack can be implemented. The environment 100 may include a network 110, an entity 120, a health monitor 130, and a DDoS mitigation service 140. The entity 120 may include a network machine or a network resource that is in need of protection from a DDoS event. In case a DDoS attack 150 is targeted to the entity 120, a DDoS event may be diagnosed in the entity 120.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (MN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication.

As shown, the health monitor 130 may be connected to the network 110. The health monitor 130 may be expressed by means of software, hardware, signaling, database query or any means of notification that would occur over an Ethernet, Internet protocol (IP), or a software defined network (SDN) where the state of the entity can be monitored for DDoS entanglement. The signaling may include transmitting notifications and messages over the Ethernet, IP, or the SDN. The database query may be performed, e.g., by using a combination of a plurality of predefined search criteria options. Thus, the health monitor 130 may be configured to monitor and determine a current state of the entity 120. The health monitor 130 may ensure notification of a DDoS event during normal operation of the entity 120.

The environment 100 may further comprise an application delivery controller (ADC) (not shown) and an external DDoS service (not shown), both connected to the network 110. Typically, the ADC includes a network appliance that manages the load balancing and delivery of service sessions from client host computers to servers based on incoming service requests. The external DDoS service may be a service provided by an appliance disposed outside a network associated with the entity 120. The external DDoS service may provide assistance associated with DDoS entanglement.

The health monitor 130 may be connected to an ADC, a DDoS mitigation service, an external DDoS service, or any generic service. The purpose of the connection is to confirm that the state of the service provided by the entity is not affected by a DDoS event.

Figure 2:
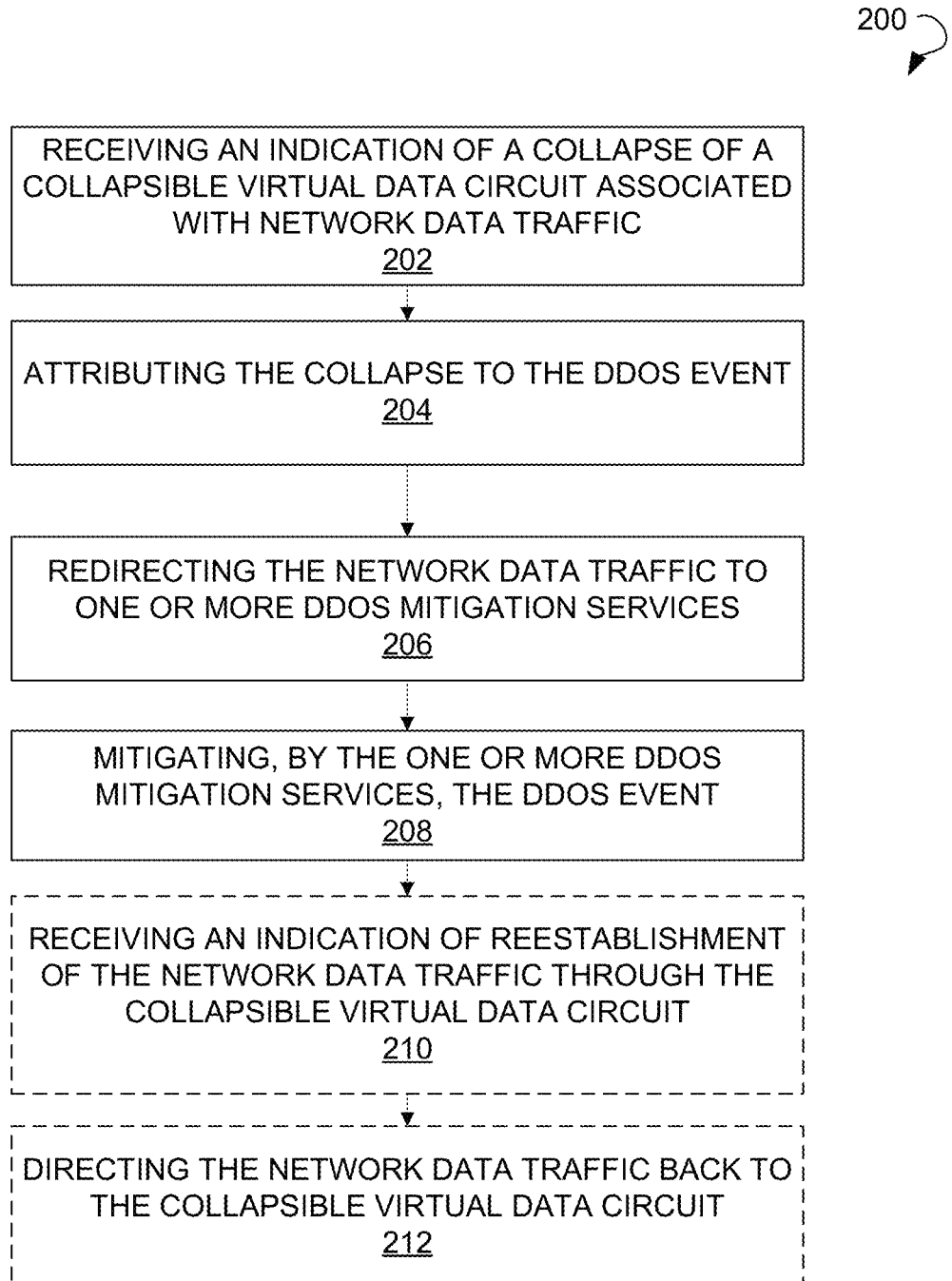
FIG. 2 is a process flow diagram showing a method for mitigating a DDoS event, according to an example embodiment.

FIG. 2 is a process flow diagram showing a method 200 for mitigating a DDoS event, according to an example embodiment. The method 200 may be performed by processing logic that may comprise hardware (e.g., decision making logic, dedicated logic, programmable logic, and microcode), software (such as software run on a general-purpose computer system or a dedicated machine), or a combination of both.

The method 200 may commence with receiving an indication of a collapse of a collapsible virtual data circuit associated with network data traffic at operation 202. In a sample embodiment, the virtual data circuit may be established by one or more of the following: software, hardware, signaling, and the like. The indication of the collapse may be established upon a notification from a health monitor associated with the collapsible virtual data circuit. The notification may indicate an interruption of the network data traffic through the collapsible virtual data circuit. In response to the received indication, the collapse may be attributed to the DDoS event at operation 204. In response, at operation 206, the network data traffic may be redirected to one or more DDoS mitigation services.

At operation 208, the DDoS event may be mitigated by the one or more DDoS mitigation services. The DDoS mitigation service may be configurable to analyze the network data traffic to detect DDoS data packages, i.e. data packages sent by an originator of the DDoS event. Furthermore, the DDoS mitigation service may be configurable to filter the DDoS data packages to provide a filtered network data traffic.

At optional operation 210, the method may further comprise receiving an indication of reestablishment of the network data traffic through the collapsible virtual data circuit. This indication may be received in response to a request sent to a health monitor associated with the collapsible virtual data circuit. The notification may be indicative of the presence of the network data traffic in the collapsible virtual data circuit. The received notification concerning the network data traffic through the collapsible virtual data circuit may be attributed to a successful mitigation of the DDoS event. In response to the received indication, the network data traffic may be directed back to the collapsible virtual data circuit at optional operation 212. The network data traffic directed back to the collapsible virtual data circuit may include the filtered network data traffic filtered by the DDoS mitigation service.

In an example embodiment, the indication of the collapse of the collapsible virtual data circuit and the indication of reestablishment of the network data traffic through the collapsible virtual data circuit may be performed by at least one of the following: Ethernet, IP, and SDN. Optionally, the method 200 may comprise changing a Domain Name System (DNS) name upon receiving the indication of the collapse of the collapsible virtual data circuit.

Figure 3:
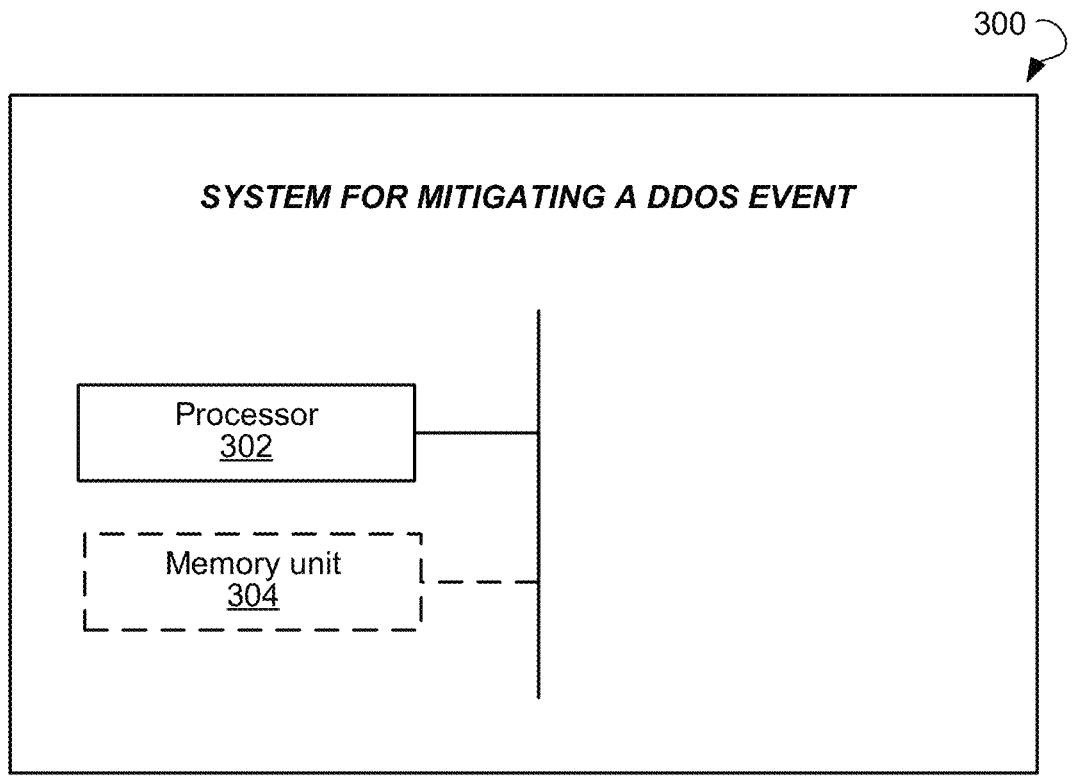
FIG. 3 is a block diagram showing various modules of a system for mitigating a DDoS event, according to an example embodiment.

FIG. 3 shows a block diagram showing various modules of an exemplary system 300 for mitigating a DDoS event. Specifically, the system 300 may include a processor 302. The processor 302 may be configurable to receive an indication of a collapse of a collapsible virtual data circuit associated with network data traffic. The virtual data circuit may be established by one or more of the following: software, signaling, and the like. To receive the indication of the collapse, the processor 302 may send a request to a health monitor associated with the collapsible virtual data circuit. In response to the request, the processor 302 may receive, from the health monitor, a notification about interruption of the network data traffic through the collapsible virtual data circuit.

Furthermore, the processor 302 may be configurable to attribute, in response to the received indication, the collapse to the DDoS event. When the DDoS event is detected, the processor 302 may be further configurable to redirect the network data traffic to one or more DDoS mitigation services. Furthermore, the processor 302 may be configurable to mitigate the DDoS event by the one or more DDoS mitigation services.

In an example embodiment, the DDoS mitigation service may analyze the network data traffic to detect DDoS data packages. After the analysis, the DDoS mitigation service may filter the DDoS data packages to provide filtered network data traffic.

In an example embodiment, the processor 302 may be further configurable to receive an indication of reestablishment of the network data traffic through the collapsible virtual data circuit. To obtain the indication, the processor 302 may send a request to a health monitor associated with the collapsible virtual data circuit. In response to the request, the processor 302 may receive, from the health monitor, a notification concerning the presence of the network data traffic in the collapsible virtual data circuit. The processor 302 may attribute the notification concerning the presence of the network data traffic in the collapsible virtual data circuit to successful mitigation of the DDoS event. After receiving of the indication of the reestablishment, the processor 302 may direct the network data traffic back to the collapsible virtual data circuit. The network data traffic directed back to the collapsible virtual data circuit may include the filtered network data.

In an example embodiment, the processor 302 may be configurable to receive the indication of the collapse of the collapsible virtual data circuit and the indication of the reestablishment of the network data traffic through the collapsible virtual data circuit via at least one of the following: Ethernet, IP, and SDN.

In an example embodiment, the processor 302 may be further configurable to change a Domain Name System (DNS) name upon receiving the indication of the collapse of the collapsible virtual data circuit.

In an example embodiment, the system 300 may optionally comprise a memory 304 that may store instructions and code implementable by the processor 302.

Figure 4:
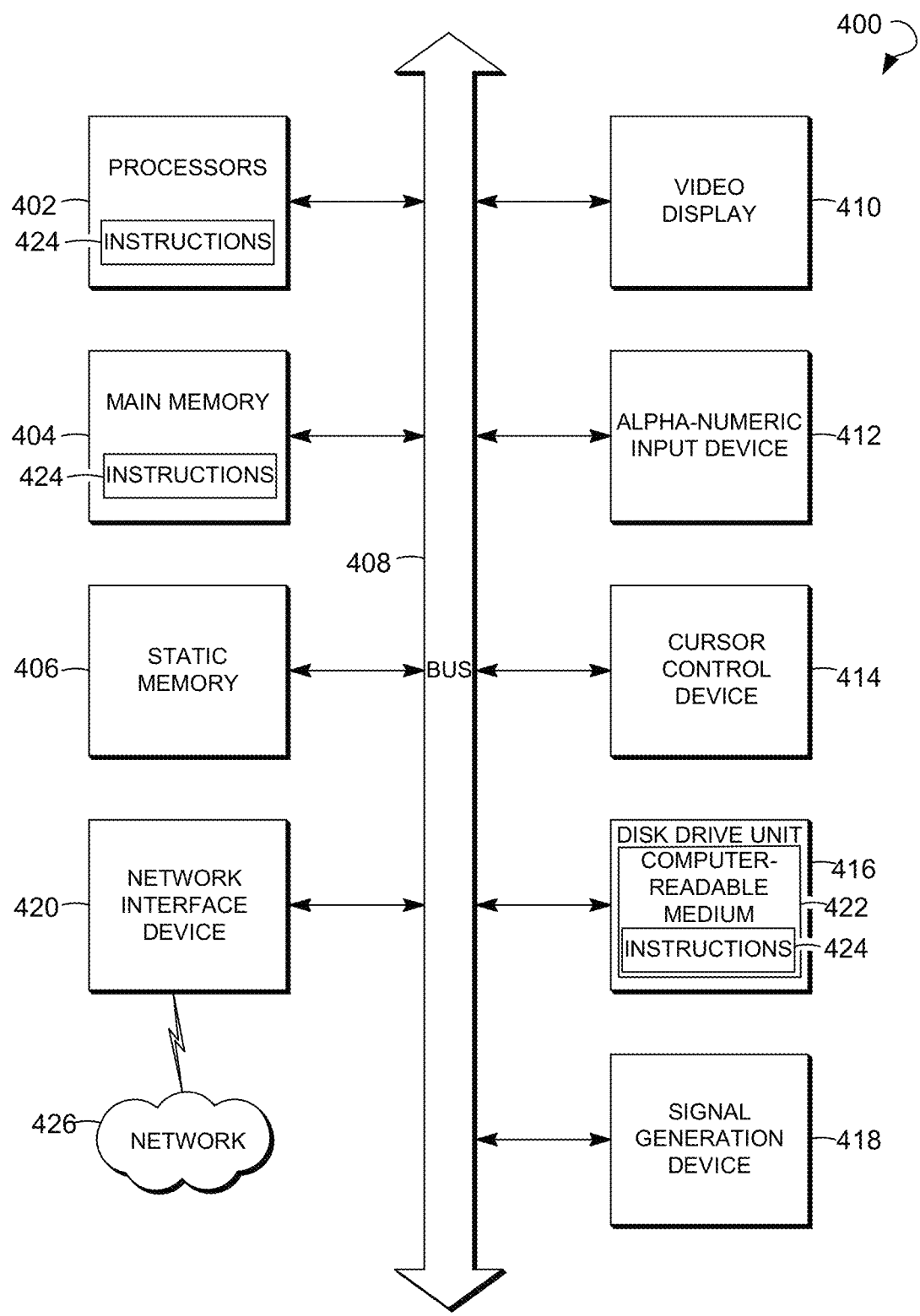
FIG. 4 shows a diagrammatic representation of a computing device for a machine in the example electronic form of a computer system, within which a set of instructions for causing the machine to perform any one or more of the methodologies discussed herein can be executed.

FIG. 4 shows a diagrammatic representation of a machine in the example electronic form of a computer system 400, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 may also include an alphanumeric input device 412 (e.g., a keyboard), a cursor control device 414 (e.g., a mouse), a disk drive unit 416, a signal generation device 418 (e.g., a speaker), and a network interface device 420.

The disk drive unit 416 includes a non-transitory computer-readable medium 422, on which is stored one or more sets of instructions and data structures (e.g., instructions 424) embodying or utilized by any one or more of the methodologies or functions described herein. The instructions 424 may also reside, completely or at least partially, within the main memory 404 and/or within the processors 402 during execution thereof by the computer system 400. The main memory 404 and the processors 402 may also constitute machine-readable media.

The instructions 424 may further be transmitted or received over a network 426 via the network interface device 420 utilizing any one of a number of well-known transfer protocols (e.g., Hyper Text Transfer Protocol (HTTP)).

While the computer-readable medium 422 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for mitigating a DDoS event are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for mitigating a distributed denial of service (DDoS) event, the system comprising:
    an application delivery controller located inside a network, the application delivery controller comprising a hardware processor, the hardware processor being configured to:
    send a request to a health monitor concerning a state of the network; attribute a lack of response to the request inside the network from the health monitor to be an indication of a collapse of a collapsible virtual data circuit, the collapsible virtual data circuit being designed to collapse in response to the DDoS event in the network, the health monitor being part of the collapsible virtual data circuit inside the network; and
    based on the indication of the collapse of the collapsible virtual data circuit, redirect the network data traffic associated with the collapsible virtual data circuit; wherein the redirecting the network data traffic associated with the collapsible virtual data circuit includes: redirecting the network data traffic to one or more DDoS mitigation services; analyzing the network data traffic by the one or more DDoS mitigation services to detect DDoS data packages; and filtering the DDoS data packages by the one or more DDoS mitigation services to provide filtered network data traffic;
    and a memory coupled to the application delivery controller, the memory storing instructions executable by the hardware processor of the application delivery controller.

2. The system of claim 1, wherein the hardware processor is further configured to mitigate, via one or more DDoS mitigation services, the DDoS event.

3. The system of claim 1, wherein the indication of the collapse of the collapsible virtual data circuit includes a lack of communications with the collapsible virtual data circuit for a predetermined period of time.

4. The system of claim 1, wherein the hardware processor is further configured to:
    receive an indication of reestablishment of the network traffic through the collapsible virtual data circuit; and
    in response to the indication, direct the network data traffic to the collapsible virtual data circuit.

5. The system of claim 4, wherein the indication of reestablishment of the network traffic through the collapsible virtual data circuit includes receiving communications from the collapsible virtual data circuit.

6. The system of claim 5, wherein the reestablished network data traffic includes the filtered network data traffic.

7. The system of claim 4, wherein the receiving of the indication of reestablishment includes:
sending a further request to the health monitor associated with the collapsible virtual data circuit regarding the state of the network data traffic in the network; and
in response to the further request, receiving a notification from the health monitor, wherein the notification includes an indication of a presence of the network data traffic in the collapsible virtual data circuit.

8. The system of claim 1, wherein the health monitor is associated with the collapsible virtual data circuit that normally conveys the network data traffic and collapses in response to the DDoS event by stopping flow of the network data traffic, wherein the indication of the collapse of the collapsible virtual data circuit is determined in response to the request.

9. A method for mitigating a distributed denial of service (DDoS) event, the method comprising:
sending, by an application delivery controller located inside a network, a request to a health monitor concerning a state of the network;
attributing, by the application delivery controller, a lack of response to the request inside the network from the health monitor to be an indication of a collapse of a collapsible virtual data circuit, the collapsible virtual data circuit being designed to collapse in response to the DDoS event in the network, the health monitor being part of the collapsible virtual data circuit inside the network; and
based on the indication of the collapse of the collapsible virtual data circuit, redirecting the network data traffic associated with the collapsible virtual data circuit; and
wherein the redirecting the network data traffic associated with the collapsible virtual data circuit includes: redirecting the network data traffic to one or more DDoS mitigation services; analyzing the network data traffic by the one or more DDoS mitigation services to detect DDoS data packages; and filtering the DDoS data packages by the one or more DDoS mitigation services to provide filtered network data traffic.

10. The method of claim 9, further comprising mitigating, by one or more DDoS mitigation services, the DDoS event.

11. The method of claim 9, wherein the indication of the collapse of the collapsible virtual data circuit includes a lack of communications with the collapsible virtual data circuit for a predetermined period of time.

12. The method of claim 9, further comprising:
receiving an indication of reestablishment of the network traffic through the collapsible virtual data circuit; and
in response to the indication, directing the network data traffic to the collapsible virtual data circuit.

13. The method of claim 12, wherein the indication of reestablishment of the network traffic through the collapsible virtual data circuit includes receiving communications from the collapsible virtual data circuit.

14. The method of claim 13, wherein the reestablished network data traffic includes the filtered network data traffic.

15. The method of claim 12, wherein the receiving of the indication of reestablishment includes:
sending a further request to the health monitor associated with the collapsible virtual data circuit regarding the state of the network data traffic in the network; and
in response to the further request regarding the status of the network data traffic, receiving a notification from the health monitor, wherein the notification includes an indication of a presence of the network data traffic in the collapsible virtual data circuit.

16. The method of claim 15, wherein the indication of the presence of the network data traffic in the collapsible virtual data circuit is attributed to a successful mitigation of the DDOS event.

17. The method of claim 9, wherein the collapsible virtual data circuit that normally conveys the network data traffic and collapses in response to the DDoS event by stopping flow of the network data traffic, wherein the indication of the collapse of the collapsible virtual data circuit is determined in response to the request.

18. A system for mitigating a distributed denial of service (DDoS) event, the system comprising:
an application delivery controller located inside a network, the application delivery controller comprising a hardware processor configured to:
send a request to a health monitor regarding a state of the network, the health monitor associated with a collapsible virtual data circuit that normally conveys network data traffic and collapses in response to the DDoS event in the network by stopping flow of the network data traffic;
attribute a lack of response to the request inside the network from the health monitor to be an indication of a collapse of the collapsible virtual data, the health monitor being part of the collapsible virtual data circuit inside the network; and
based on the indication of the collapse of a collapsible virtual data circuit, redirect the network data traffic associated with the collapsible virtual data circuit, wherein the redirecting the network data traffic associated with the collapsible virtual data circuit includes:
redirecting the network data traffic to one or more DDoS mitigation services;
analyzing the network data traffic by the one or more DDoS mitigation services to detect DDoS data packages; and
filtering the DDoS data packages by the one or more DDoS mitigation services to provide filtered network data traffic; and
a memory coupled to the application delivery controller, the memory storing instructions executable by the hardware processor of the application delivery controller.

* * * * *